United States Patent [19]
Palko et al.

[11] Patent Number: 5,550,450
[45] Date of Patent: Aug. 27, 1996

[54] DEAD-TIME EFFECT COMPENSATION FOR PULSE-WIDTH MODULATED INVERTERS AND CONVERTERS

[75] Inventors: Joseph Palko, Southington; Robert R. Zeranski, Meriden, both of Conn.

[73] Assignee: Otis Elevator Company, Farmington, Conn.

[21] Appl. No.: 53,773

[22] Filed: Apr. 28, 1993

[51] Int. Cl.$^6$ ........................................ H02P 5/40
[52] U.S. Cl. .......................... 318/800; 318/811; 318/799; 187/316; 363/41
[58] Field of Search ...................... 318/138, 254, 318/439, 800–818; 363/41

[56] References Cited

U.S. PATENT DOCUMENTS

| | | | |
|---|---|---|---|
| 4,361,794 | 11/1982 | Kawada et al. | 318/800 |
| 4,387,421 | 6/1983 | Zach et al. | 318/811 |
| 4,481,457 | 11/1984 | Zach et al. | 318/803 |
| 4,509,003 | 4/1985 | Ohnishi et al. | 318/800 |
| 4,510,430 | 4/1985 | Ashikaga et al. | 318/800 |
| 4,547,719 | 10/1985 | Sakamoto et al. | 318/723 |
| 4,562,386 | 12/1985 | Goff et al. | 318/254 |
| 4,581,693 | 4/1986 | Ueda et al. | 318/811 |
| 4,719,400 | 1/1988 | Kurakake et al. | 318/811 |
| 4,727,468 | 2/1988 | Maekawa | 318/811 |
| 4,749,923 | 6/1988 | Chieng | 318/269 |
| 4,926,104 | 5/1990 | King et al. | 318/599 |
| 5,130,626 | 7/1992 | Kajitani et al. | 318/608 |
| 5,140,248 | 8/1992 | Rowen et al. | 318/811 |
| 5,187,420 | 2/1993 | Kajitani et al. | 318/823 |
| 5,206,802 | 4/1993 | Blasko | 363/41 |
| 5,250,765 | 10/1993 | Mizuno et al. | 318/257 |
| 5,250,890 | 10/1993 | Tanamachi et al. | 318/811 |
| 5,270,632 | 12/1993 | Hirota et al. | 318/799 |
| 5,321,599 | 6/1994 | Tanamachi et al. | 318/811 |
| 5,357,181 | 10/1994 | Mutoh et al. | 318/139 |

*Primary Examiner*—Paul Ip

[57] ABSTRACT

Polarity change of a feed-forward compensation signal for compensating for a dead-time voltage disturbance is synchronized with zero crossings of a load current reference. The load current reference is advanced in time by adding a fixed phase angle, scaled by the synchronous frequency, to the synchronous coordinates angle. The load current reference is time-advanced only for timing the polarity change of the feed-forward compensation signal and not for application to the current regulators; the current regulators still use the load current reference (unadvanced). For a converter, the load current would be an AC mains input current. For an inverter, the load current could, for example, be an induction motor stator current. The shape of the feed-forward compensation signal is approximately trapezoidal and is obtained from the limited, amplified, advanced load current reference. The shape of the feed-forward compensation signal is a function of at least one of: the load current frequency, the load current amplitude and an amplification scaler.

17 Claims, 16 Drawing Sheets

15,550,450

DEAD-TIME EFFECT COMPENSATION FOR PULSE-WIDTH MODULATED INVERTERS AND CONVERTERS

TECHNICAL FIELD

The present invention relates to compensation of dead-time effect in inverters and converters.

BACKGROUND OF THE INVENTION

Inverter and converter bridges have one or more legs with two complementary switches which can never be permitted to simultaneously be in the "ON" state. Because the switches are not ideal and therefore have "turn ON" and "turn OFF" delays, an intentional dead-time between the "turn OFF" signal of one switch and the "turn ON" signal of the complementary switch must be inserted in order to avoid a short circuit of the power supply. In other words, the turn-on of the complementary switch in the inverter leg (or converter leg) is delayed by a dead-time $\Delta T$. The duration of the dead-time $\Delta T$ must be sufficient to ensure that a switch in the inverter/converter leg is off before allowing the complementary switch in the bridge leg to turn on. The dead-time $\Delta T$ is also known as a blanking interval.

Dead-time effectively creates a voltage disturbance which acts on the current regulators in current controlled inverters and converters. The sign of the voltage disturbance depends on the sign of the load current. This disturbance changes sign at every zero crossing of the load current. It is in the form of voltage steps ideally, that is, when infinite load inductances are assumed. The amplitude of the step depends on the dead-time. It is equal to $2 \times V_{bus} \times (\Delta T/TPWM)$ where $V_{bus}$ is the DC bus voltage, $\Delta T$ is the total dead-time and TPWM is the PWM cycle time. For bipolar transistors the total dead-time can be as high as 15% of the PWM cycle time.

DISCLOSURE OF THE INVENTION

The object of the present invention is to compensate for a dead-time voltage disturbance in pulse-width modulated inverters/converters. The polarity changes of the voltage disturbance are synchronized with the zero crossings of the load current (FIG. 1).

A feature is the addition of a feed-forward compensation signal, with sign opposite that of the dead-time voltage disturbance, wherein the sign change of the feed-forward compensation signal is synchronized with the sign change of a time-advanced version of the load current reference (as shown in FIG. 2) rather than the load current feedback as in the prior art. The time advance accounts for the delays in the system so that the feed-forward compensation signal produces dead-time voltage disturbance cancellation which is on time and not late, as in the prior art.

A second feature of the invention is that the shape of the feed-forward compensation signal is approximately trapezoidal (FIG. 3) and not a step, as in the prior art. The approximately trapezoidal shape is obtained by amplifying and limiting the advanced load current reference (FIG. 4). The limit is equal to the desired magnitude of the feed-forward compensation signal. Such an approximately trapezoidal feed-forward compensation signal, obtained from a limited and amplified advanced load current reference, has variable unparallel sides slope. The slope depends on at least one of: the load current frequency, the magnitude of the load current and an amplification scaler.

A third feature of the invention is the method of the production of a fixed time advance (as opposed to a fixed phase advance) of the advanced load current reference. The method utilizes synchronous to stationary coordinates transformation whereby the time advance of a load current reference is obtained by advancing the synchronous coordinates angle used in the transformation by adding to it a phase advancement angle scaled by the synchronous coordinates frequency. Sine and cosine of the time-advanced synchronous coordinates angle are also time advanced and, when used in the transformation, produce a time-advanced load current reference.

According to the present invention, polarity change of a feed-forward compensation signal for compensating for a dead-time voltage disturbance is synchronized with zero crossings of a load current reference. In further accord with the present invention, the load current reference is advanced in time by adding a fixed phase angle, scaled by the synchronous frequency, to the synchronous coordinates angle. The load current reference is time-advanced only for timing the polarity change of the feed-forward compensation signal and not for application to the current regulators; the current regulators still use the load current reference (unadvanced). Note that for a converter, the load current would be an AC mains input current. For an inverter, the load current could, for example, be an induction motor stator current. In further accord with the present invention, the shape of the feed-forward compensation signal is approximately trapezoidal and is obtained from a limited, amplified, advanced load current reference. In further accord with the present invention, the shape of the feed-forward compensation signal is a function of at least one of: the load current frequency, the load current amplitude and an amplification scaler.

BEST MODE FOR CARRYING OUT THE INVENTION

List of Symbols

Figure 1:
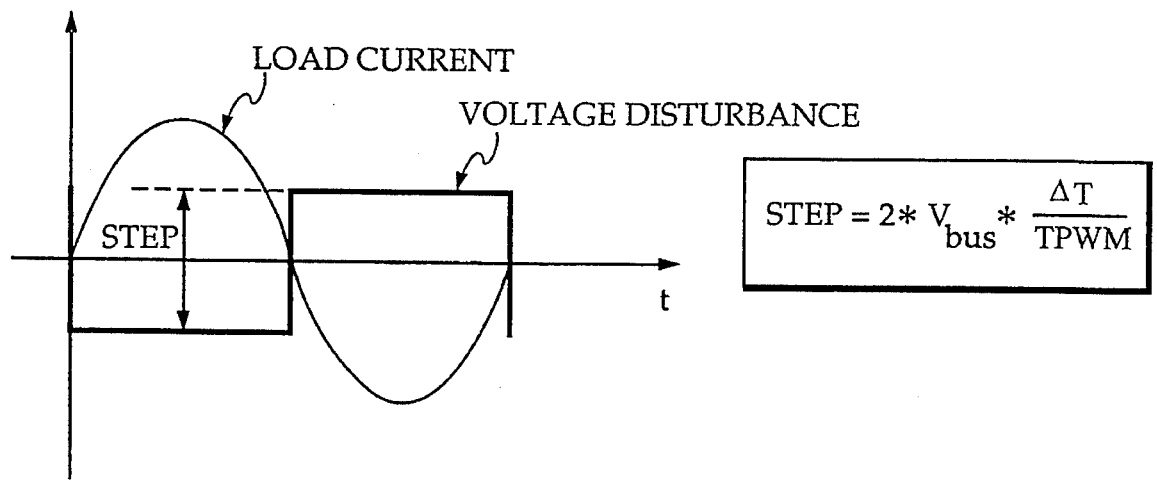
FIG. 1 shows the load current zero crossings occurring at the same time as a dead-time voltage disturbance where a dead-time voltage disturbance is a step function as assumed by the prior art.
Figure 2:
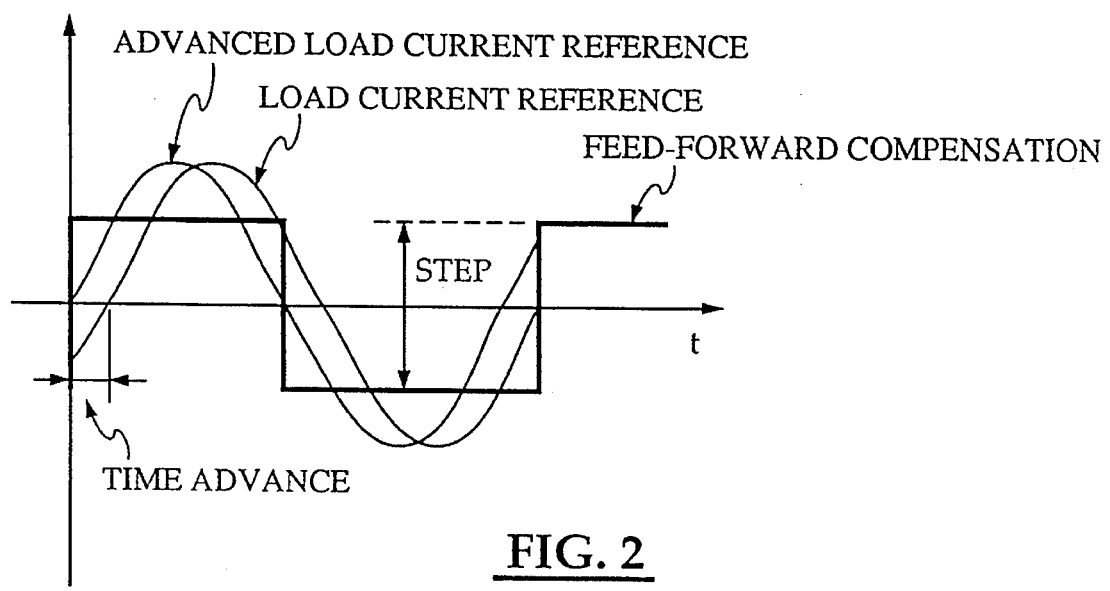
FIG. 2 shows a load current reference, a load current reference advanced in time with respect to the load current reference and a dead-time voltage disturbance shown as a step function as assumed by the prior art.
Figure 3:
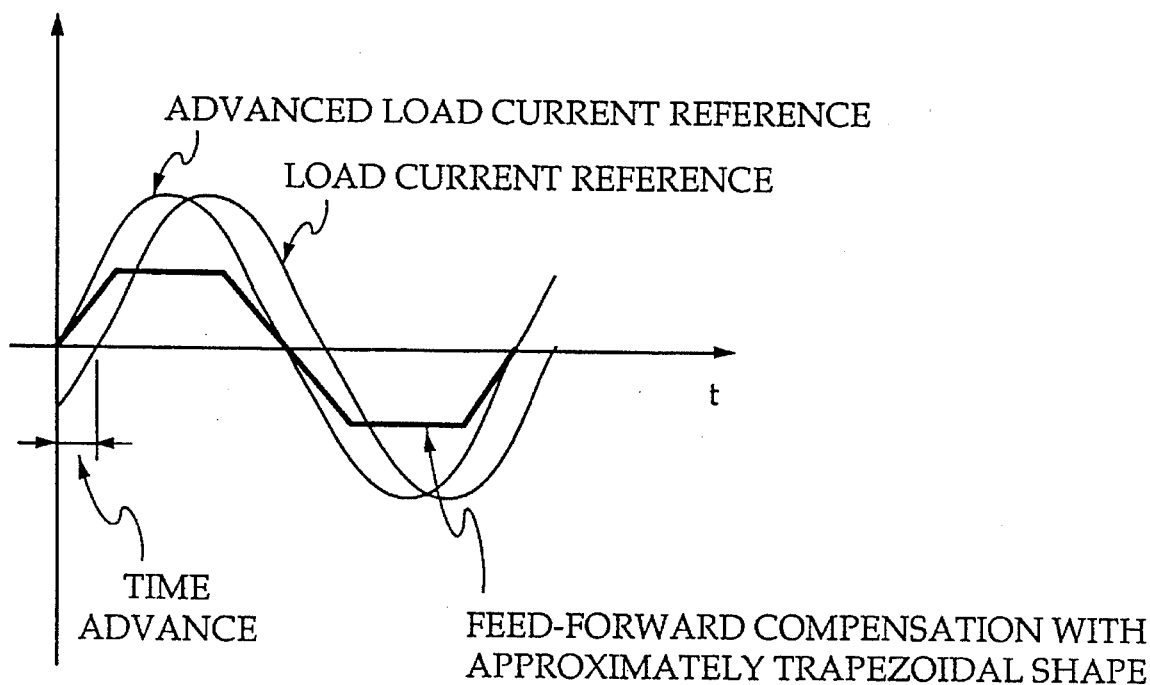
FIG. 3 shows the load current reference, time-advanced load current reference, and a feed-forward compensation signal with an approximately trapezoidal shape according to the invention.
Figure 4:
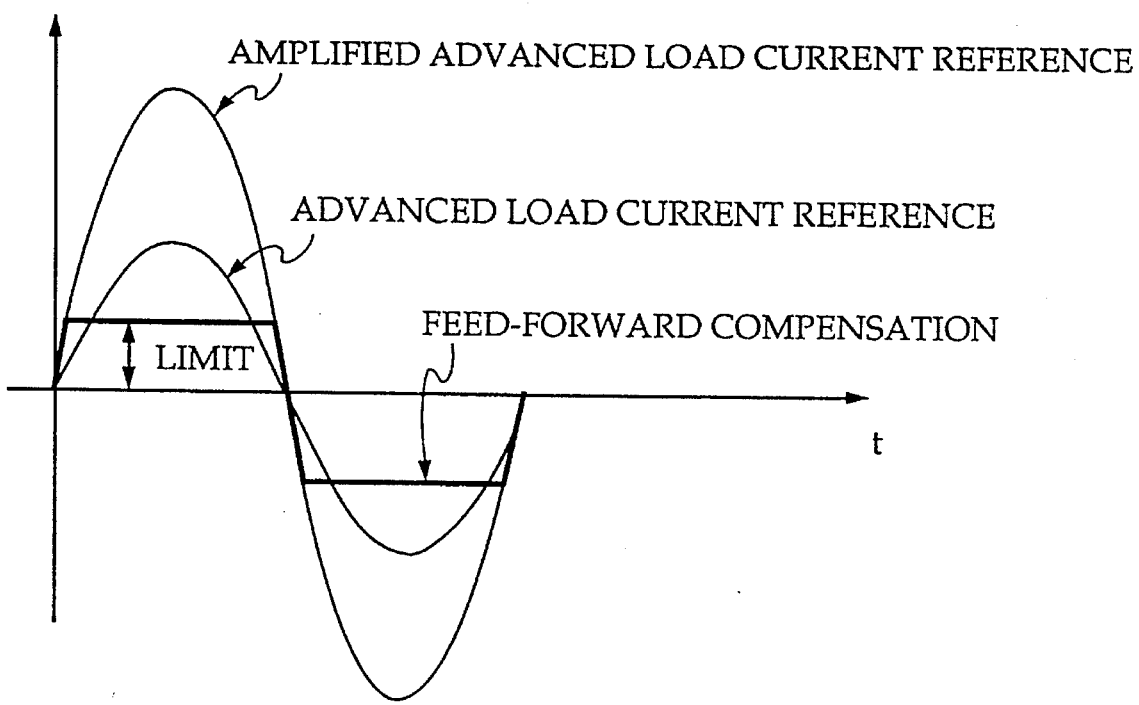
FIG. 4 shows the feed-forward compensation signal, according to the present invention, as an amplitude-limited version of an amplified time-advanced load current reference.

| Symbol | Description |
|---|---|
| * | denotes a reference |
| e | denotes "electrical" |
| $\Delta T$ | dead-time |
| $\omega_s^{*e}$ | synchronous coordinates frequency |
| $\theta_s^{*e}$ | synchronous coordinates angle |
| $\theta_{ph}^{*e}$ | phase advancement angle |
| $\theta_t^{*e}$ | time advancement angle |
| $\theta_{AD}^{*e}$ | time-advanced synchronous coordinates angle |
| $t_{AD}$ | time advance |
| $PWM_s^{*c}$ | synchronous coordinates PWM reference |
| $\sin\theta_s^{*c}$ | sine of $\theta_s^{*c}$ |
| $PWM_{st}^{*c}$ | stationary coordinates PWM reference |
| $PWM_{stc}^{*c}$ | compensated PWM reference |
| $I_s^{*c}$ | synchronous coordinates current reference |
| $\sin\theta_{AD}^{*c}$ | sine of $\theta_{AD}^{*c}$ |
| $I_{AD}^{*c}$ | stationary coordinates advanced current reference |
| AS | amplification scaler |
| $I_{ADA}^{*c}$ | amplified advanced current reference in stationary coordinates |
| FCA | feed-forward compensation amplitude |
| FFC | feed-forward compensation |
| $R_d^{*c}$ | PWM or current d reference in synchronous coordinates |
| $R_q^{*c}$ | PWM or current q reference in synchronous coordinates |
| $R_d^{*s}$ | PWM or current d reference in two-phase stationary coordinates |
| $R_q^{*s}$ | PWM or current q reference in two-phase stationary coordinates |
| $R_x^*$ | three-phase stationary coordinates X, Y, and Z phase references |
| $R_y^*$ | |
| $R_z^*$ | |
| $\theta^{*c}$ | coordinates transformation angle ($\theta_s^{*c}$ or $\theta_{AD}^{*c}$) |
| I_MAG_E | motor magnetizing current reference in synchronous coordinates |
| I_TORQ_E | motor torque current reference in synchronous torque coordinates |
| I_MAG_S | motor magnetizing current reference in two-phase stationary coordinates |
| I_TORQ_S | motor torque current reference in two-phase stationary coordinates |
| ADV_SIN | sine of $\theta_{AD}^{*c}$ for induction motor |
| ADV_COS | cosine of $\theta_{AD}^{*c}$ for induction motor |
| I_X_S_AD | time-advanced current reference in stationary coordinates, X phase |
| I_Y_S_AD | time-advanced current reference in stationary coordinates, Y phase |
| I_Z_S_AD | time-advanced current reference in stationary coordinates, Z phase |
| I_X_S_ADA | amplified time-advanced current reference in stationary coordinates, X phase |
| I_Y_S_ADA | amplified time-advanced current reference in stationary coordinates, Y phase |
| I_Z_S_ADA | amplified time-advanced current reference in stationary coordinates, Z phase |
| COMP_X | feed-forward compensation signal, X phase |
| COMP_Y | feed-forward compensation signal, Y phase |
| COMP_Z | feed-forward compensation signal, Z phase |
| V_D_E | magnetizing voltage PWM reference in synchronous coordinates |
| V_Q_E | torque voltage PWM reference in synchronous coordinates |
| V_D_S | magnetizing voltage PWM reference in two-phase stationary coordinates |
| V_Q_S | torque voltage PWM reference in two-phase stationary coordinates |
| PWM_X_C | compensated PWM reference in three-phase stationary coordinates, X phase |
| PWM_Y_C | compensated PWM reference in three-phase stationary coordinates, Y phase |
| PWM_Z_C | compensated PWM reference in three-phase stationary coordinates, Z phase |
| IM | induction motor |
| PVT | primary velocity transducer |
| PP | position pulses |
| $\theta_r^*$ | mechanical rotor position angle relative to stator |
| P/2 | number of motor pole pairs |
| $\omega_r^{*c}$ | electrical motor frequency |
| $\omega_{sr}^{*c}$ | synchronous coordinates frequency relative to rotor (slip frequency) |
| $\theta_r^{*c}$ | electrical rotor position relative to stator |
| $\theta_{sr}^{*c}$ | synchronous coordinates angle relative to rotor (slip angle) |
| $\tau_r^*$ | motor rotor time constant |
| $V_R$ | mains line voltage, R phase |
| $V_S$ | mains line voltage, S phase |
| $V_T$ | mains line voltage, T phase |
| $V_d$ | mains d voltage component in two-phase stationary coordinates |
| $V_q$ | mains q voltage component in two-phase stationary coordinates |
| $PH_{er}$ | phase error (output of PLL phase detector) |
| $\omega_{er}^c$ | frequency error (in converter PLL) |
| $\omega_{ref}^{*c}$ | converter reference frequency equal to the nominal mains frequency |

Figure 5:
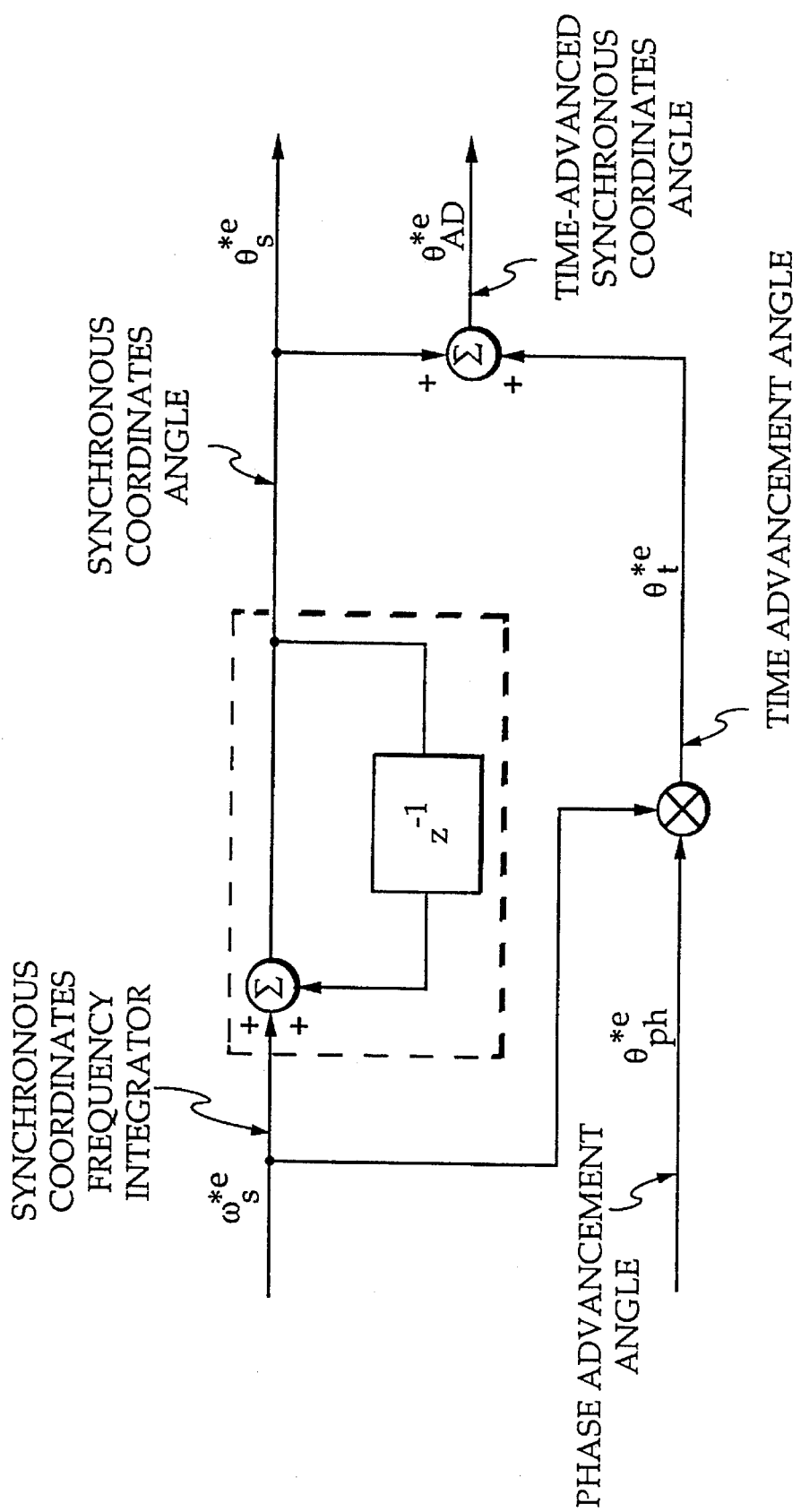
FIG. 5 is a functional block diagram of the production of an angle $\theta_{AD}^{*e}$ for time advancement of the load current reference.

FIG. 5 is a functional block diagram of the production of a signal for advancing in time a load current reference by means of a time-advanced synchronous coordinates angle $\theta_{AD}^{*e}$. This angle $\theta_{AD}^{*e}$ is to be used to create an advance in time of the feed-forward compensation signal. In FIG. 5, a load current reference frequency (synchronous coordinates frequency) $\omega_s^{*e}$ is integrated to produce a synchronous coordinates angle $\theta_s^{*e}$. A fixed advancement phase angle $\theta_{ph}^{*e}$ is multiplied by the synchronous coordinates frequency $\omega_s^{*e}$ to provide an angle $\theta_t^{*e}$ which is used for time advancement by a fixed time amount. The synchronous coordinates frequency $\omega_s^{*e}$, and the phase advancement angle $\theta_{ph}^{*e}$ multiplying it, could each be variable. If the phase advancement angle $\theta_{ph}^{*e}$ is variable, the time advance produced by $\theta_t^{*e}$ varies proportionally. The time advancement angle $\theta_t^{*e}$ is then added to the synchronous coordinates angle $\theta_s^{*e}$ to produce a time-advanced synchronous coordinates angle $\theta_{AD}^{*e}$.

Figure 6:
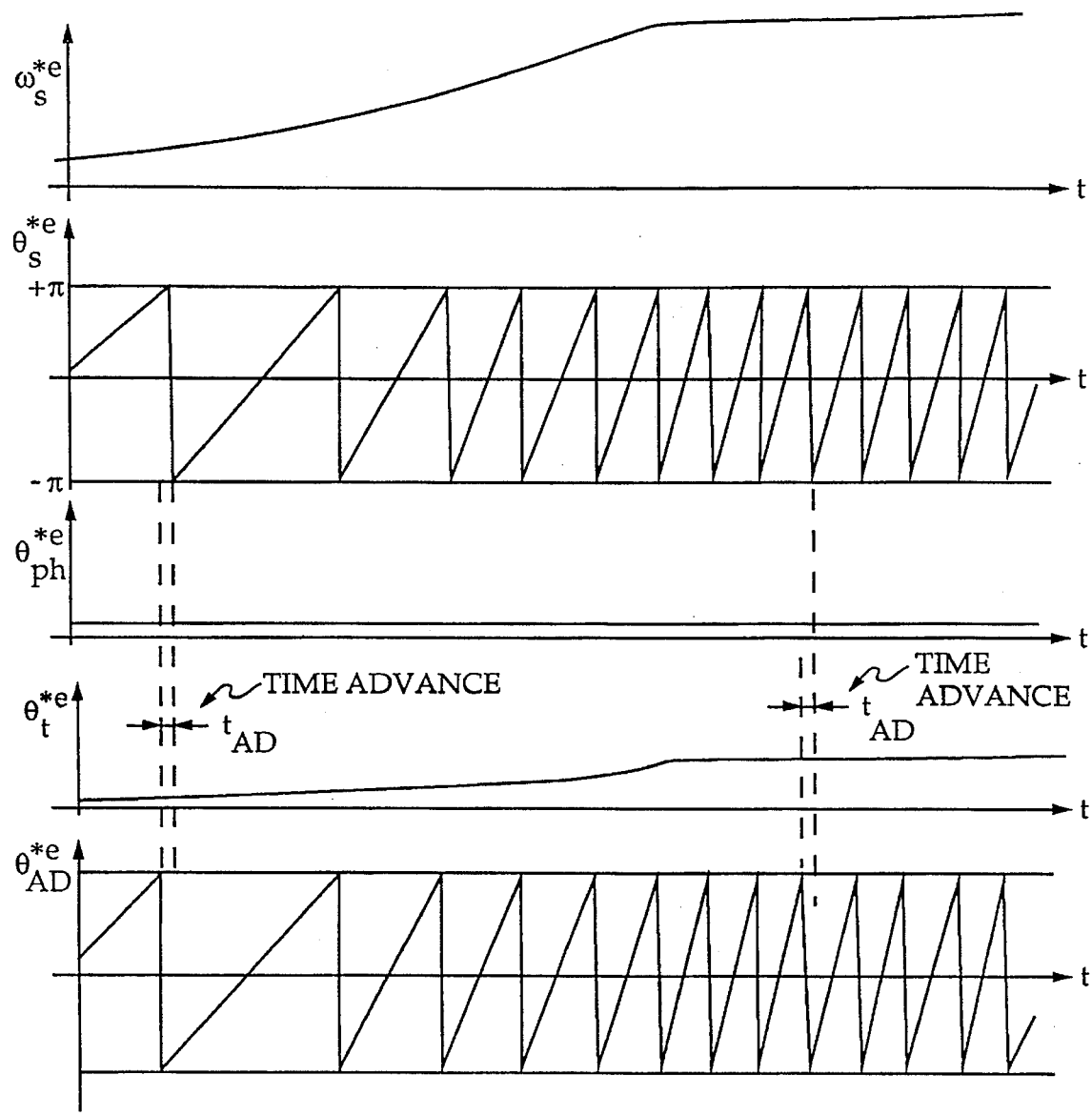
FIG. 6 is a plot of signals presented in the functional block diagram of FIG. 5 as a function of time.

In FIG. 6, as the synchronous coordinates frequency $\omega_s^{*e}$ increases, the frequency of the zero crossings of all the other waveforms shown in FIG. 6 also increases. Although $\theta_{ph}^{*e}$ is a fixed phase angle, $\theta_t^{*e}$ increases as the synchronous coordinates frequency $\omega_s^{*e}$ increases. Finally, $\theta_{AD}^{*e}$ is advanced in time by $t_{AD}$ as compared to $\theta_s^{*e}$.

Figure 7:
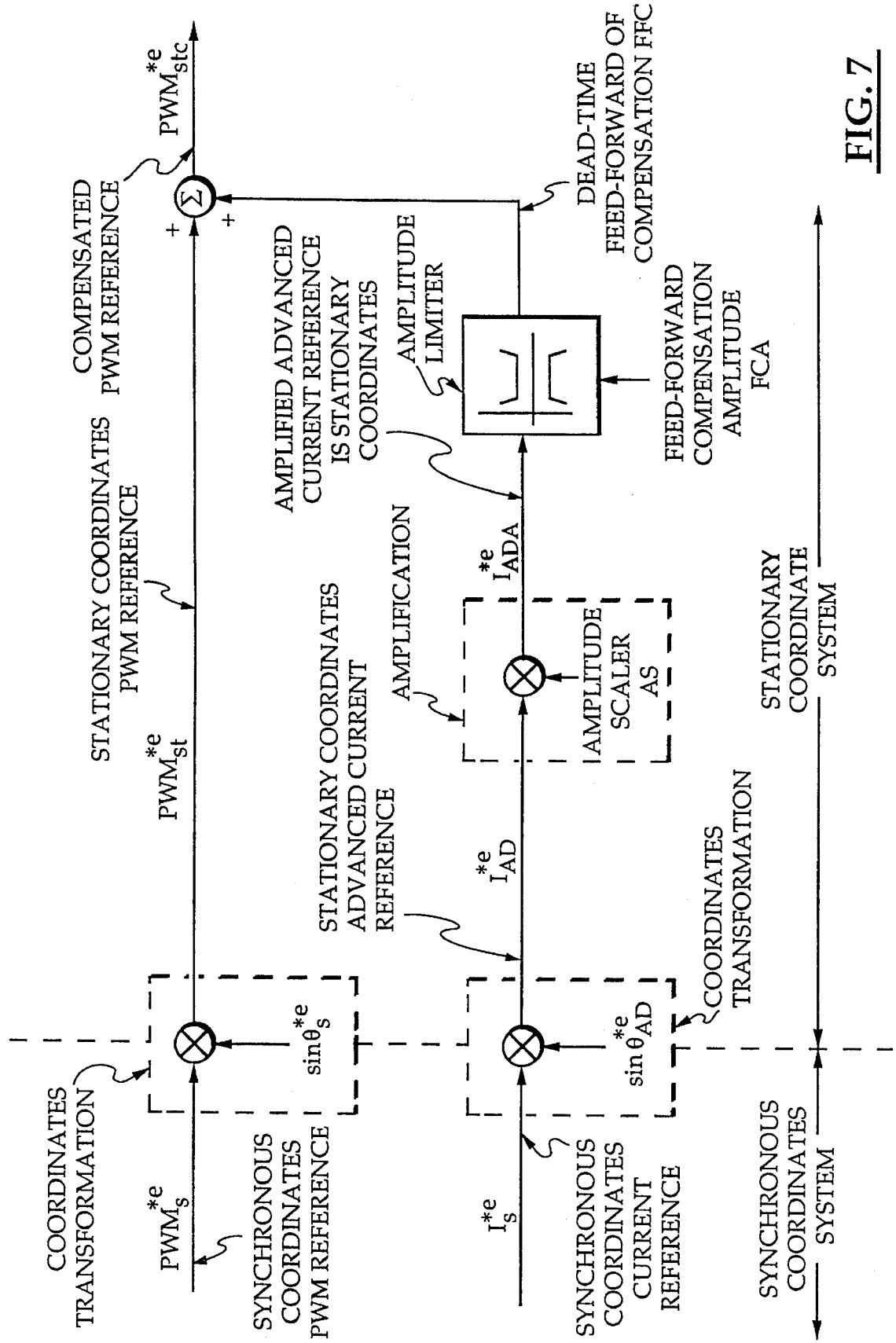
FIG. 7 is a functional block diagram of the method for producing, shaping and timing of the feed-forward compensation signal.

FIG. 7 shows a method for producing, shaping, and timing of the feed-forward compensation signal for a single-phase case. A pulse width modulation (PWM) reference $PWM_s^{*e}$ is multiplied by the $\sin \theta_s^{*e}$ for providing a PWM reference $PWM_{st}^{*e}$ in stationary coordinates. Adding this signal to a feed-forward compensation signal produces a PWM reference which is compensated for the dead-time voltage disturbance. To shape the feed-forward compensation signal, a current reference in synchronous coordinates $I_s^{*e}$ is multiplied by $\sin \theta_{AD}^{*e}$ to produce an advanced current reference in stationary coordinates $I_{AD}^{*e}$. The stationary coordinates advanced current reference $I_{AD}^{*e}$ is multiplied by an amplification scaler AS to produce a magnified advanced current reference $I_{ADM}^{*e}$. This is limited to the amplitude of the feed-forward compensation signal FCA and the feed-forward compensation signal FFC is added to the PWM reference in stationary coordinates $PWM_{st}^{*e}$ to produce the compensated PWM reference in stationary coordinates $PWM_{stc}^{*e}$.

Figure 8:
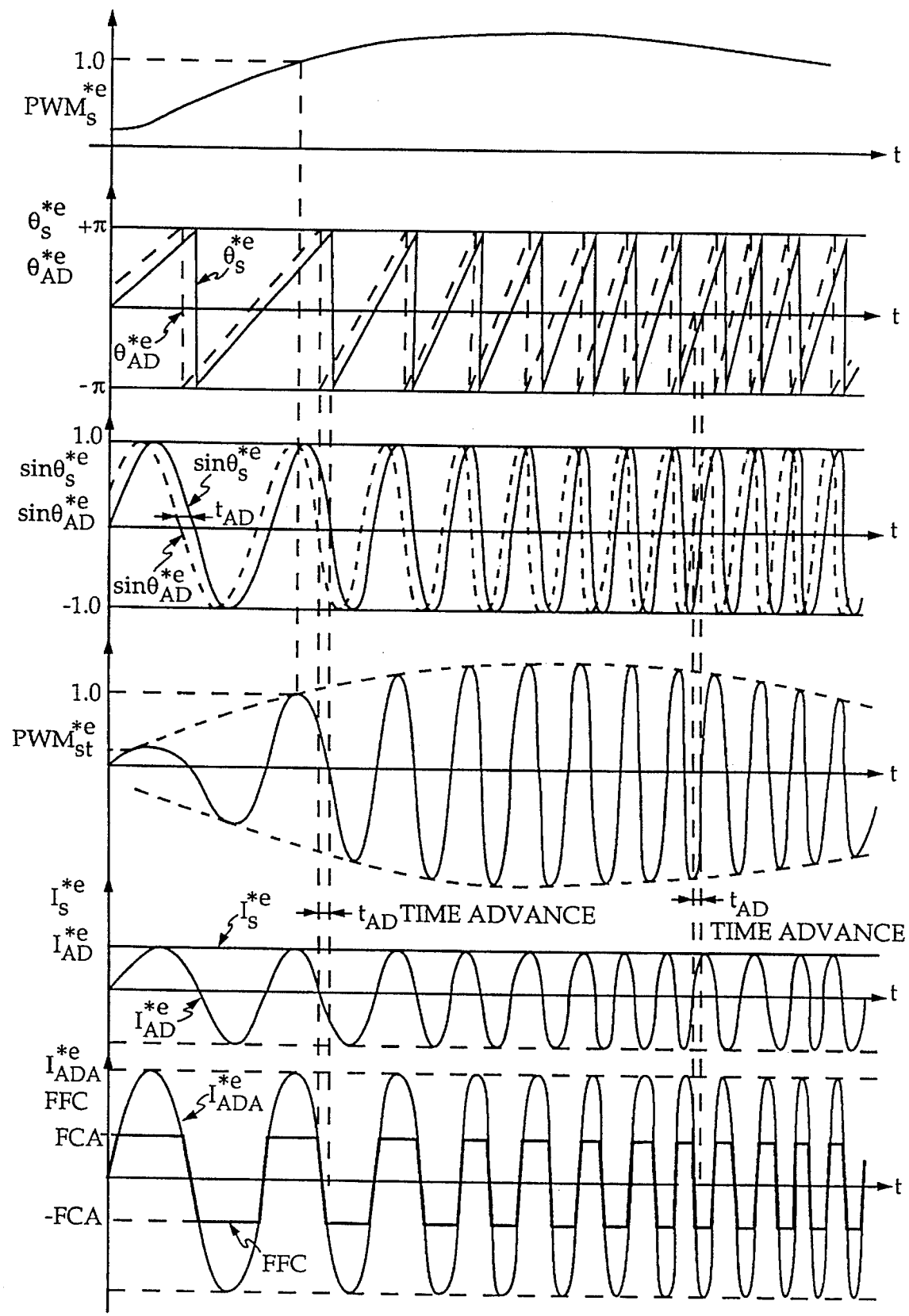
FIG. 8 is a plot of signals presented in the block diagram of FIG. 7 as a function of time. $\theta_S^{*e}$ and $\theta_{AD}^{*e}$ correspond to those in FIG. 6.

FIG. 8 is a plot of signals presented in the functional block diagram of FIG. 7 on a common time axis. Synchronous coordinates angle $\theta_s^{*e}$ and time-advanced synchronous coordinates angle $\theta_{AD}^{*e}$ are obtained as described in FIG. 6. The frequency of the sine of $\theta_s^{*e}$ ($\sin \theta_s^{*e}$) and of the sine of $\theta_{AD}^{*e}$ ($\sin \theta_{AD}^{*e}$) is proportional to the synchronous coordinates frequency $\omega_s^{*e}$ in FIG. 6. The synchronous coordinates PWM reference $PWM_s^{*e}$ has an arbitrary shape. The stationary coordinates PWM reference $PWM_{st}^{*e}$ is obtained by multiplying $PWM_s^{*e}$ by $\sin \theta_s^{*e}$. The envelope of $PWM_{st}^{*e}$ is equal to $PWM_s^{*e}$. Equivalently, the stationary coordinates advanced current reference $I_{AD}^{*e}$ is obtained by multiplying the synchronous coordinates current reference $I_s^{*e}$ by $\sin \theta_{AD}^{*e}$. The envelope of $I_{AD}^{*e}$ is equal to $I_s^{*e}$. FIG. 8 shows a constant-amplitude $I_s^{*e}$, but in a general case $I_s^{*e}$ could have a variable amplitude. $I_{AD}^{*e}$ is time-advanced by time $t_{AD}$ in respect to $PWM_{st}^{*e}$. The amplified stationary coordinates advanced current reference $I_{ADA}^{*e}$ and its amplitude-limited version (feed-forward compensation FFC) are shown. FFC is time-advanced in respect to $PWM_{st}^{*e}$ by time $t_{AD}$.

Figure 9:
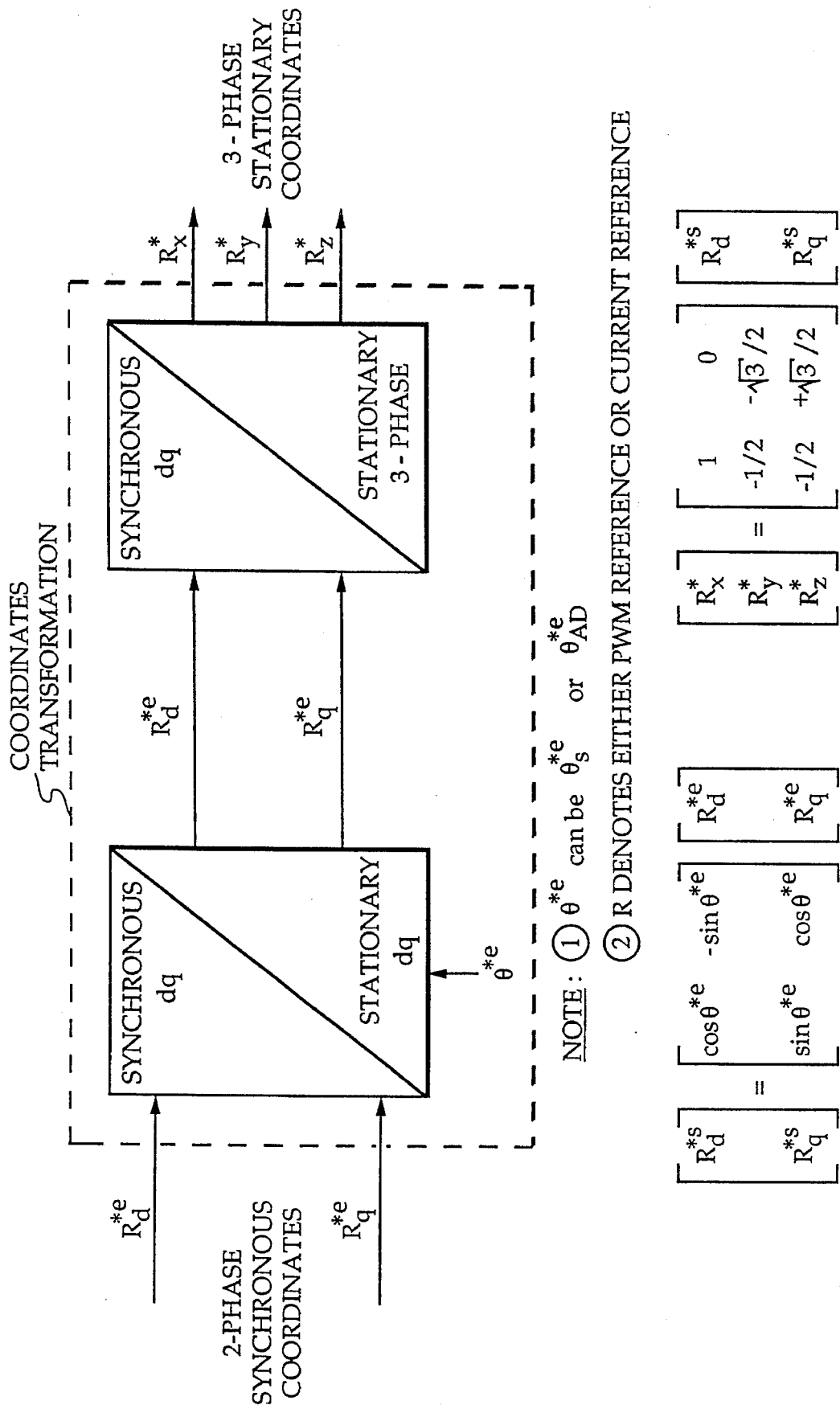
FIG. 9 is a functional block diagram of the coordinates transformation from two-phase synchronous coordinates to three-phase stationary coordinates.

Whereas FIGS. 5–8 illustrate the present invention for single-phase case, FIG. 9 shows, in the form of a functional block diagram, transformation of a reference signal in two-phase synchronous coordinates $R_d^{*e}$, $R_q^{*e}$ into three-phase stationary coordinates $R_X^*$, $R_Y^*$, $R_Z^*$. First, the two-phase synchronous coordinates signal $R_d^{*e}$, $R_q^{*e}$ is transformed from a two-phase synchronous coordinates signal into a two-phase signal $R_d^{*s}$, $R_q^{*s}$ in a stationary coordinates. The coordinates transformation is a function of the synchronous coordinates angle $\theta_s^{*e}$, or its time-advanced version $\theta_{AD}^{*e}$. For purposes of the present invention, the reference may be the PWM reference or any current reference. The two-phase stationary coordinates signal $R_d^{*s}$, $R_q^{*s}$ is then transformed into three-phase stationary coordinates $R_X^*$, $R_Y^*$, $R_Z^*$. The transformation matrices are shown.

Figure 10:
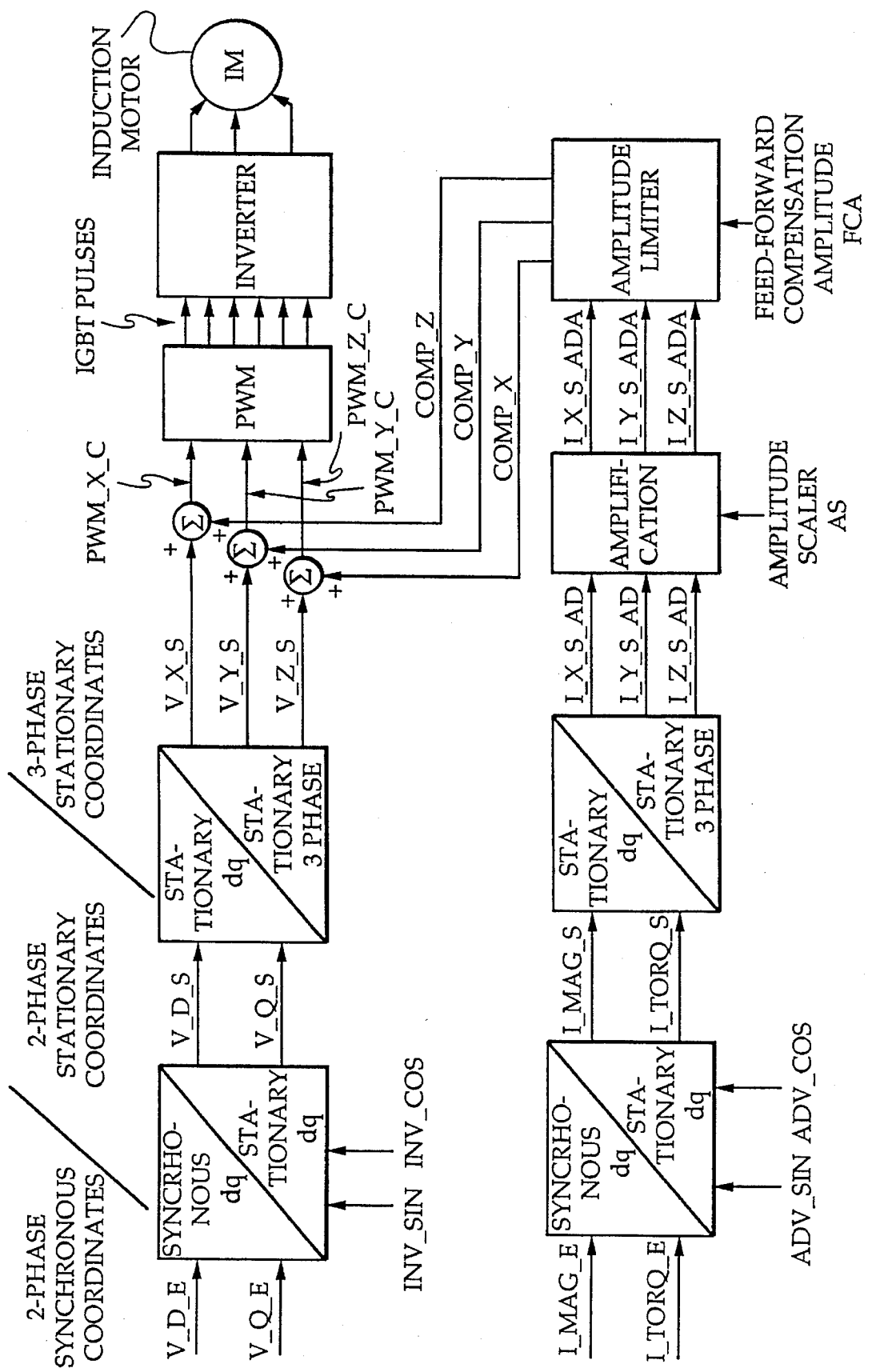
FIG. 10 is a functional block diagram of the method for producing, shaping and timing of the feed-forward compensation signal for a three-phase system and is an alternative embodiment to that of FIG. 7.

FIG. 10 shows an alternative embodiment to that of FIG. 7 for a three-phase induction motor (IM). FIG. 10 shows the method for producing, shaping, and timing of the feed-forward compensation signal. Two components of the motor current reference, a magnetizing current reference I_MAG_E and a torque current reference I_TORQ_E, are transformed from two-phase synchronous coordinate DC values to two-phase stationary coordinate AC values (I_MAG_S and I_TORQ_S, respectively) as a function of the sine and cosine of the time-advanced versions of the synchronous coordinates angle (ADV_SIN and ADV_COS, respectively) which is $\theta_{AD}^{*e}$ for the one phase case of FIG. 5 generalized to include inverters and converters. I_MAG_S and I_TORQ_S are converted to three-phase stationary coordinates AC values (I_X_S_AD, I_Y_S_AD, and I_Z_S_AD) similar to $I_{AD}^{*e}$ in FIG. 7. These time-advanced three-phase stationary coordinates current references (I_X_S_AD, I_Y_S_AD, and I_Z_S_AD) are then amplified and limited to produce the three-phase feed-forward compensation signals (COMP_X, COMP_Y, and COMP_Z). Two components of the stator voltage are provided as a magnetizing voltage PWM reference (V_D_E) and a torque voltage PWM reference (V_Q_E). As above, these PWM references (V_D_E, V_Q_E) are transformed to three-phase stationary coordinates AC values (V_X_S, V_Y_S, V_Z_S). They (V_X_S, V_Y_S, V_Z_S) are then summed with the feed-forward compensation signals COMP_X, COMP_Y, and COMP_Z, respectively, to provide the compensated PWM reference signals PWM_X_C, PWM_Y_C, and PWM_Z_C, respectively. These signals (PWM_X_C, PWM_Y_C, and PWM_Z_C, respectively) are applied to the inverter which provides three-phase stator voltages to the induction motor.

Figure 11:
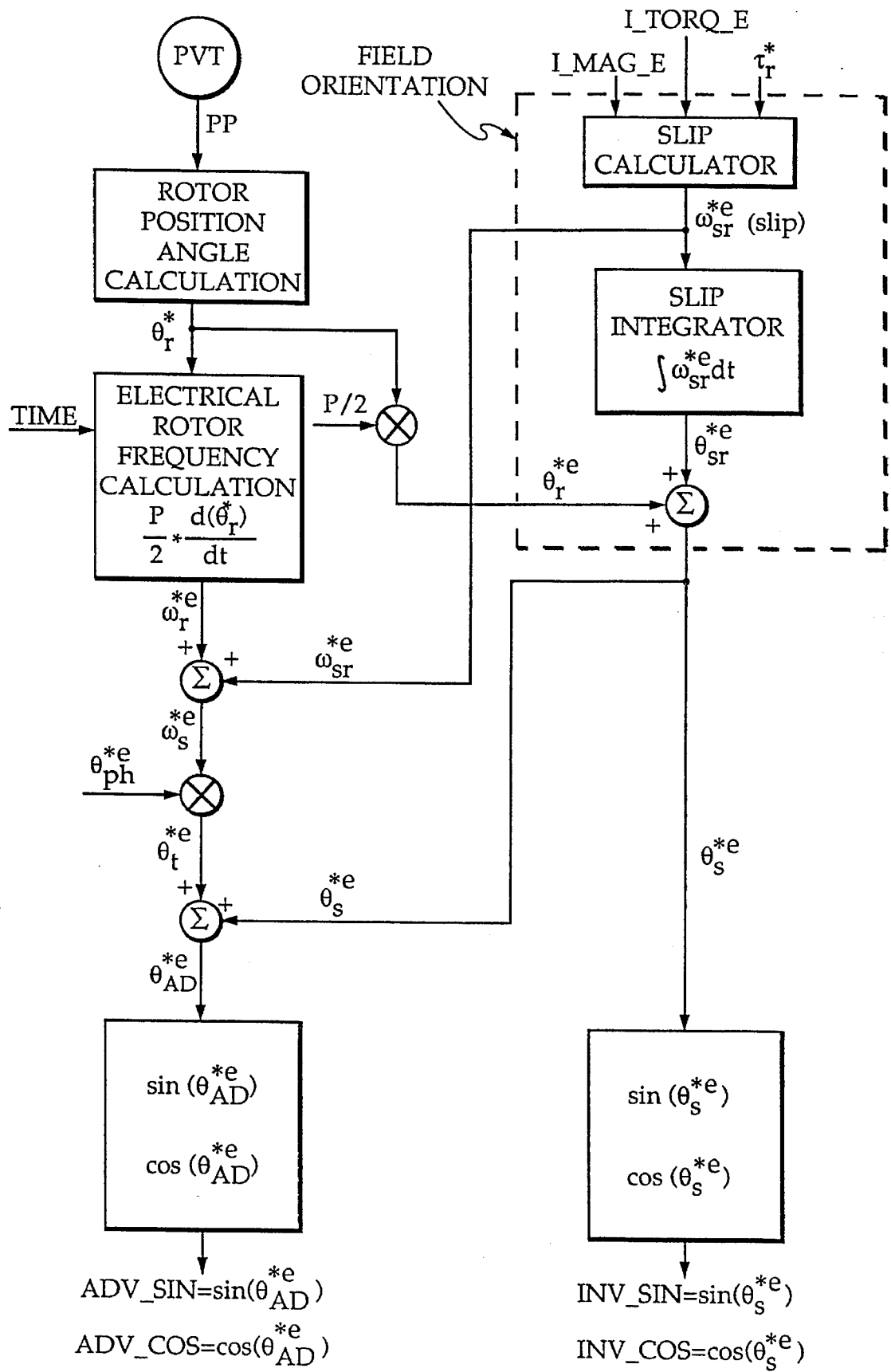
FIG. 11 is an alternate embodiment to that of FIG. 5 for producing an angle for time advancement of the load current reference for a field-oriented three-phase AC induction motor.

FIG. 11 shows an alternate embodiment to that of FIG. 5 for a field-oriented controlled induction motor. In FIG. 11, the synchronous coordinates frequency $\omega_s^{*e}$ is obtained as the sum of two frequencies: an electrical rotor frequency $\omega_r^{*e}$ and a synchronous coordinates frequency relative to rotor (slip frequency) $\omega_{sr}^{*e}$. $\omega_r^{*e}$ is calculated from a mechanical rotor position angle relative to stator $\theta_r^*$ which is obtained from primary velocity transducer PVT position pulses PP. $\theta_r^*$ is differentiated and multiplied by the number of the motor pole pairs P/2 to obtain $\omega_r^{*e}$. A fixed phase advancement angle $\theta_{ph}^{*e}$ is multiplied by $\omega_s^{*e}$ which is computed as explained above to produce the time advancement angle $\theta_t^{*e}$. This $\theta_t^{*e}$ is added to the synchronous coordinates angle $\theta_s^{*e}$ to produce the time-advanced synchronous coordinates angle $\theta_{AD}^{*e}$. Sine and cosine of that angle are equal to ADV_SIN and ADV_COS, respectively. ADV_SIN and ADV_COS are, in turn, used in the synchronous coordinates transformations as shown in FIG. 10. The sine and cosine of the synchronous coordinates angle $\theta_s^{*e}$ (INV_SIN and INV_COS, respectively) are obtained as a part of the Field Orientation (Vector Control) process as follows: in FIG. 5, $\theta_s^{*e}$ is obtained by integrating $\omega_s^{*e}$. As shown in FIG. 11 though, $\theta_s^{*e}$ consists of two parts: electrical rotor position relative to stator $\theta_r^{*e}$ and the synchronous coordinates angle relative to rotor (slip angle) $\theta_{sr}^{*e}$. Because $\theta_r^{*e}$ is obtained as an angle from the PVT (by multiplying $\theta_r^*$ by the number of motor pole pairs P/2), only the slip frequency $\omega_{sr}^{*e}$ portion of the synchronous coordinates frequency $\omega_s^{*e}$ must be integrated (as opposed to the entire $\omega_s^{*e}$ which must be integrated in FIG. 5) to obtain $\theta_{sr}^{*e}$. The slip frequency $\omega_{sr}^{*e}$ is calculated by the slip calculator according to field orientation rules from the magnetizing and torque current references in synchronous coordinates (I_MAG_E and I_TORQ_E, respectively) and from the rotor time constant $\tau_r^*$.

Figure 12:
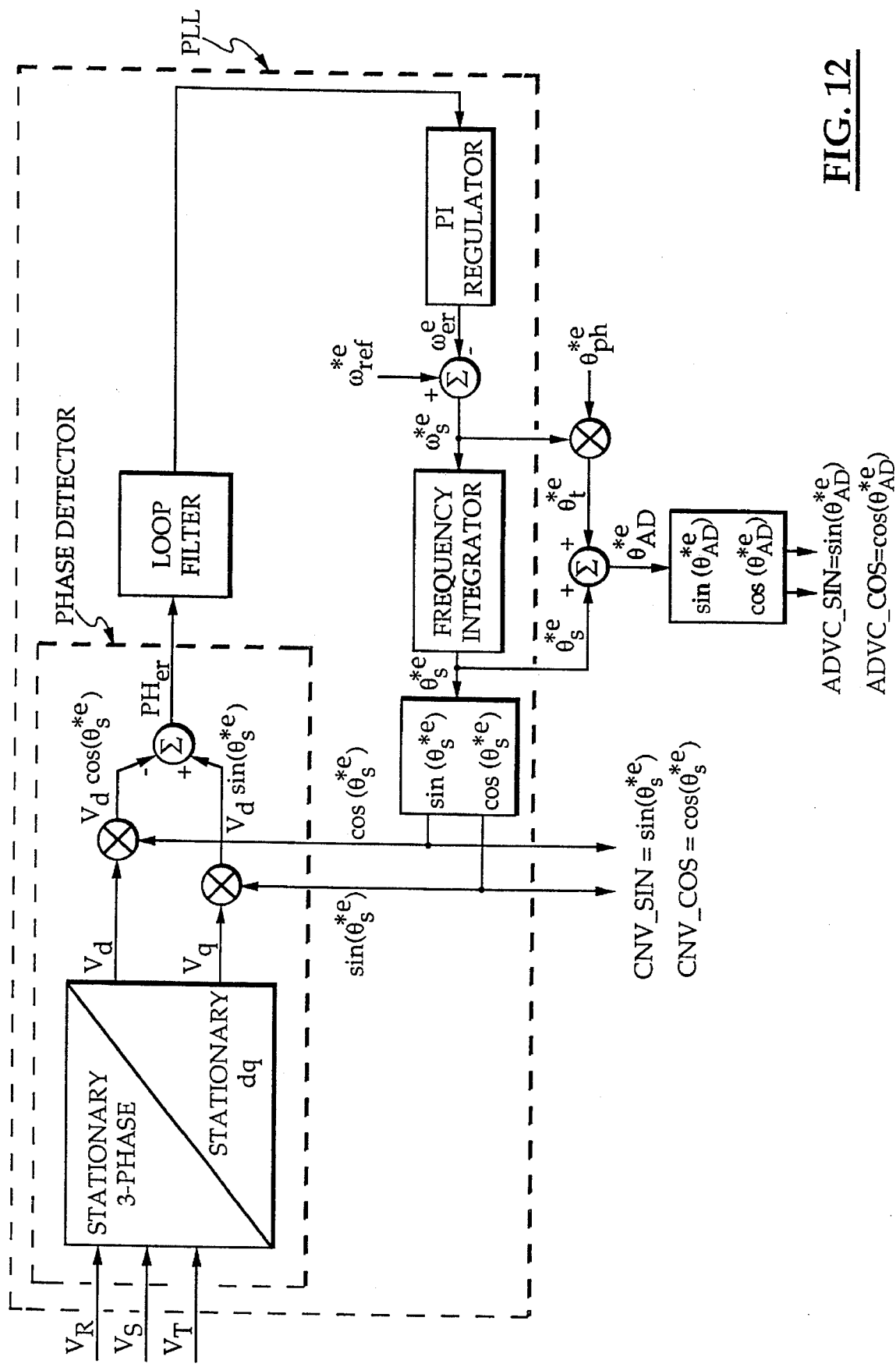
FIG. 12 shows an alternate embodiment of FIG. 5 for a converter with PLL synchronization with a mains power supply.
Figure 13:
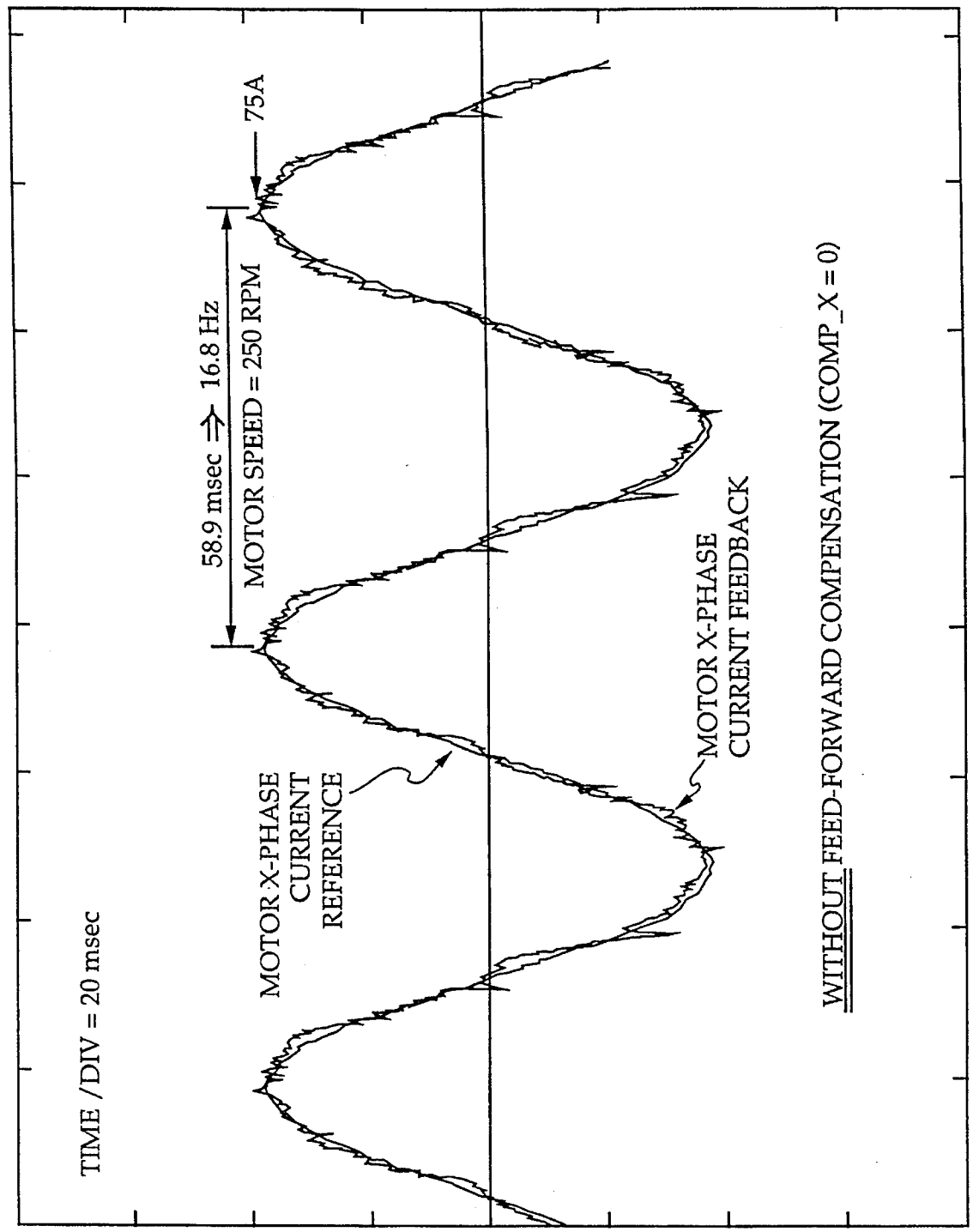
FIG. 13 shows an induction motor current reference and current feedback (16.8 Hz) WITHOUT dead-time compensation at motor speed of 250 rpm and current of 75 A peak.
Figure 14:
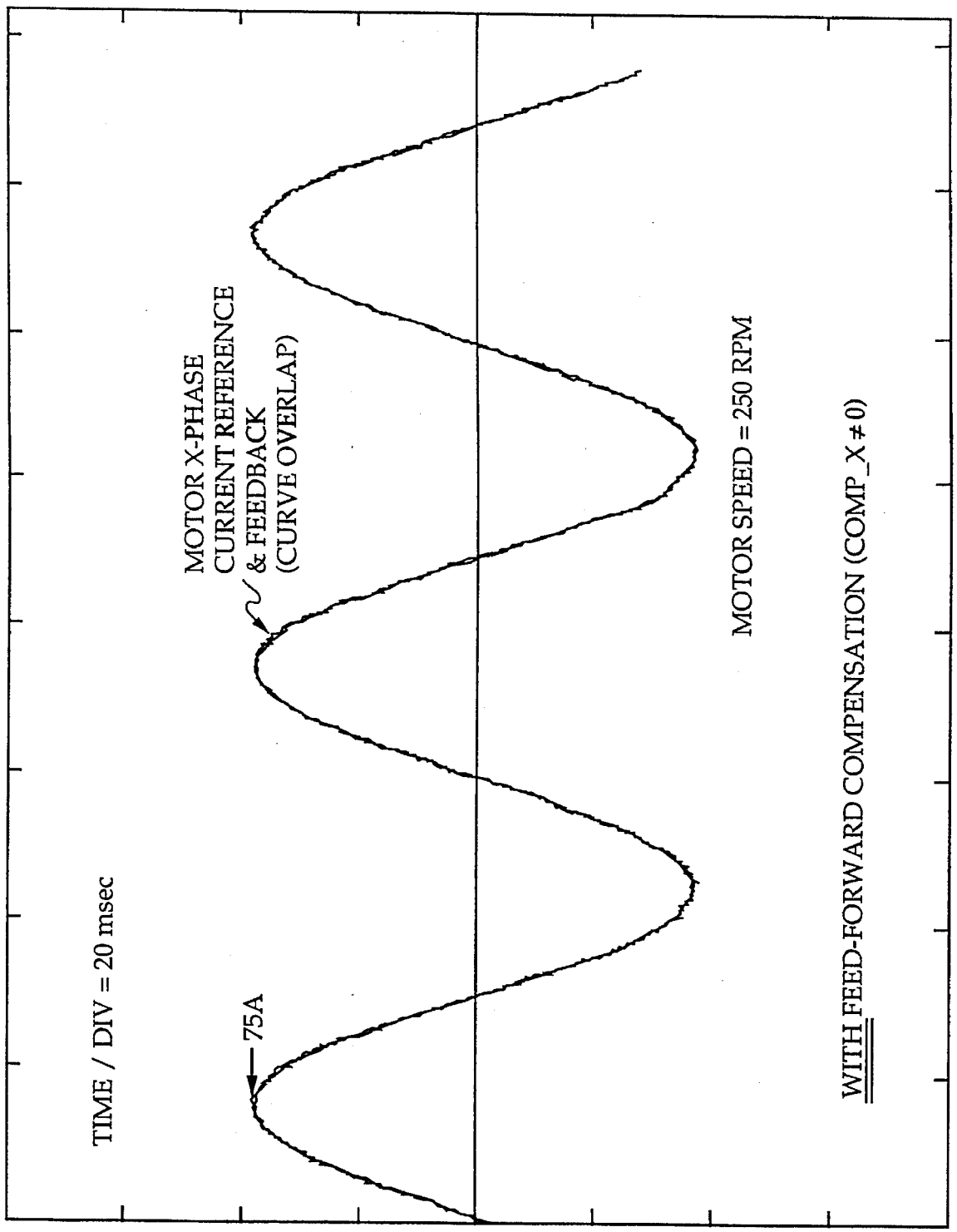
FIG. 14 shows an induction motor current reference and current feedback WITH dead-time compensation at motor speed of 250 rpm and current of 75 A peak.
Figure 15:
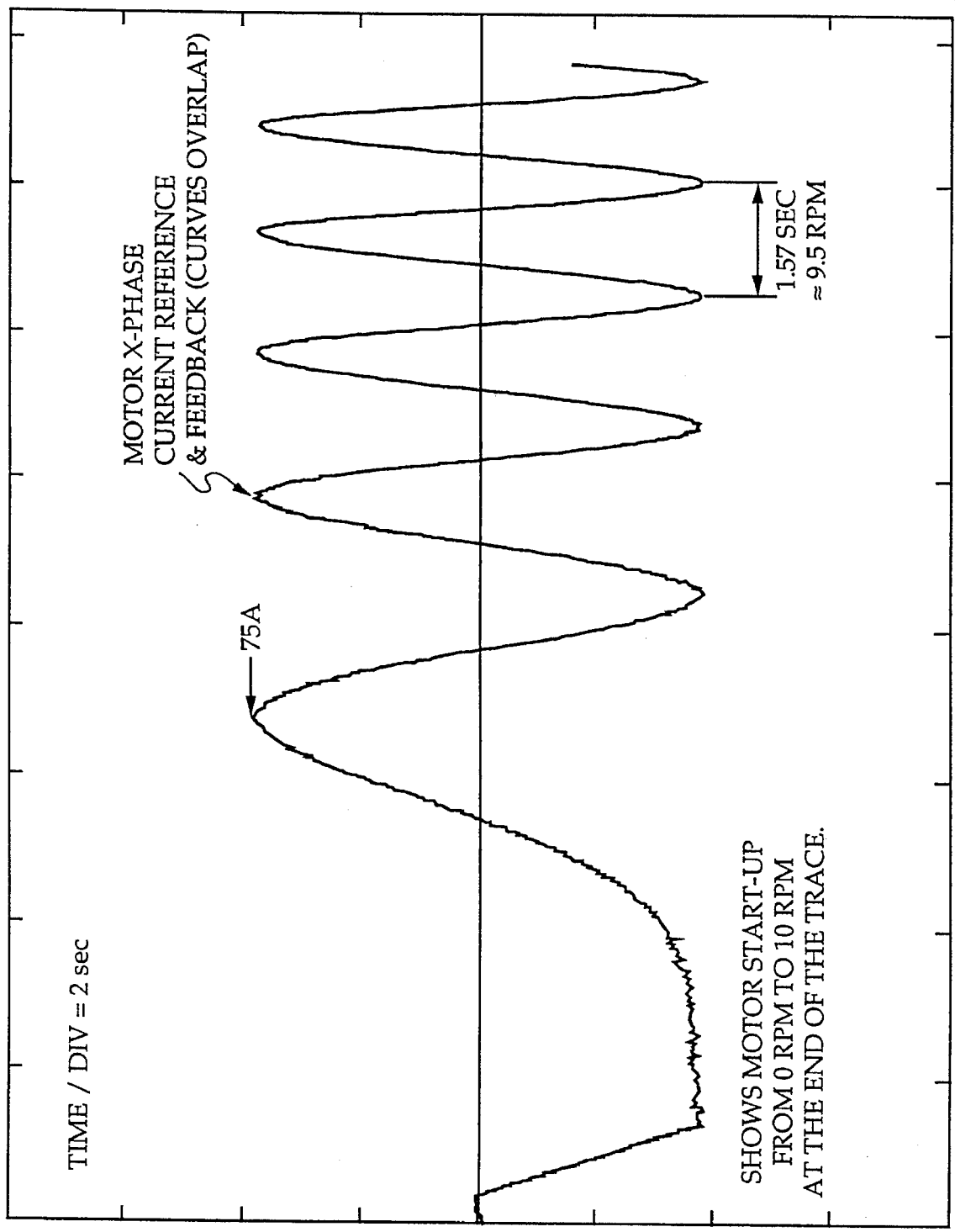
FIG. 15 shows an induction motor current reference and current feedback WITH dead-time compensation at variable motor speed and current of 75 A peak.
Figure 16:
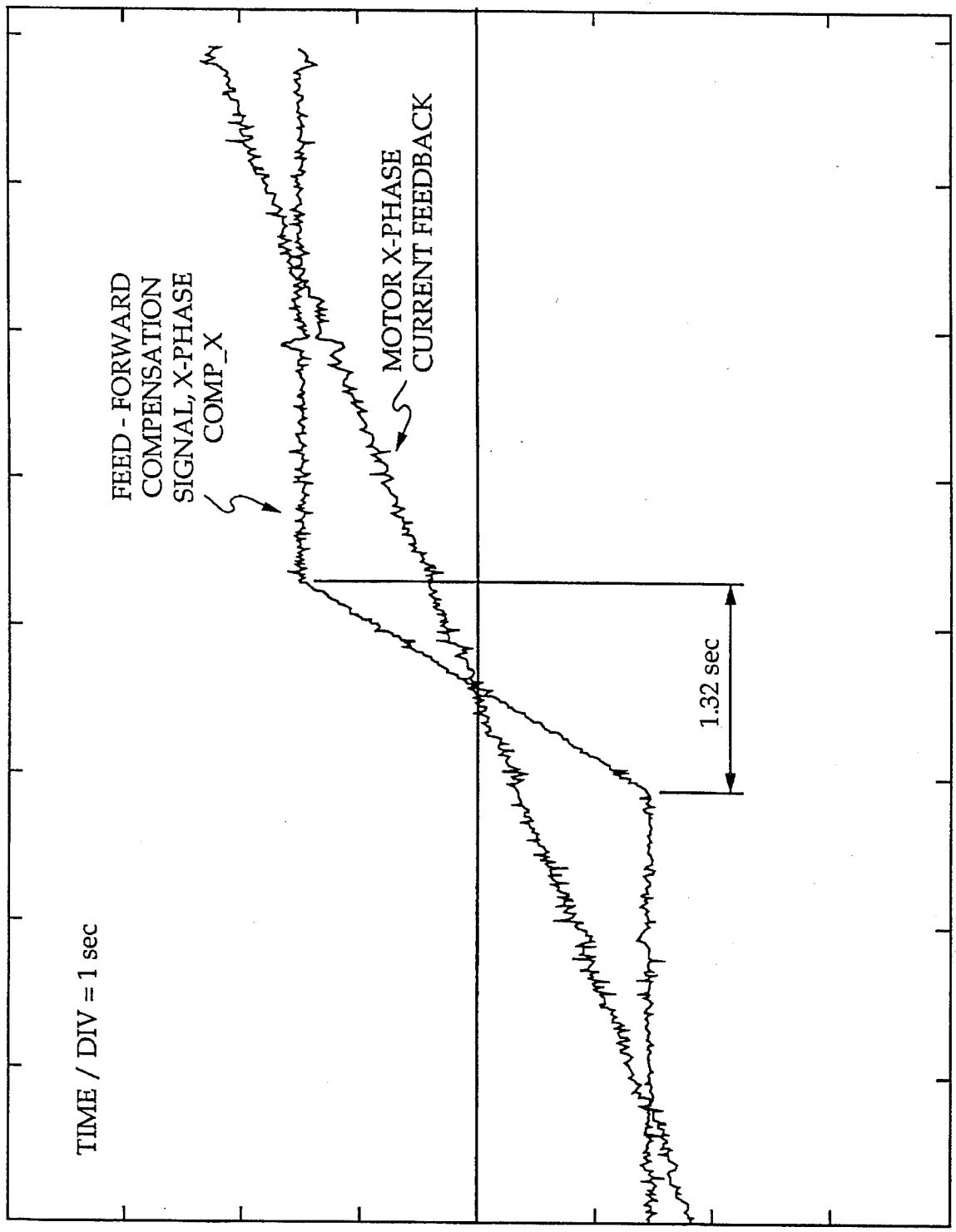
FIGS. 16, 17, and 18 show the motor current feedback and the dead-time feed-forward compensation signal for various motor current frequencies. An approximately 1000 times difference can be observed in the compensation slope.
Figure 17:
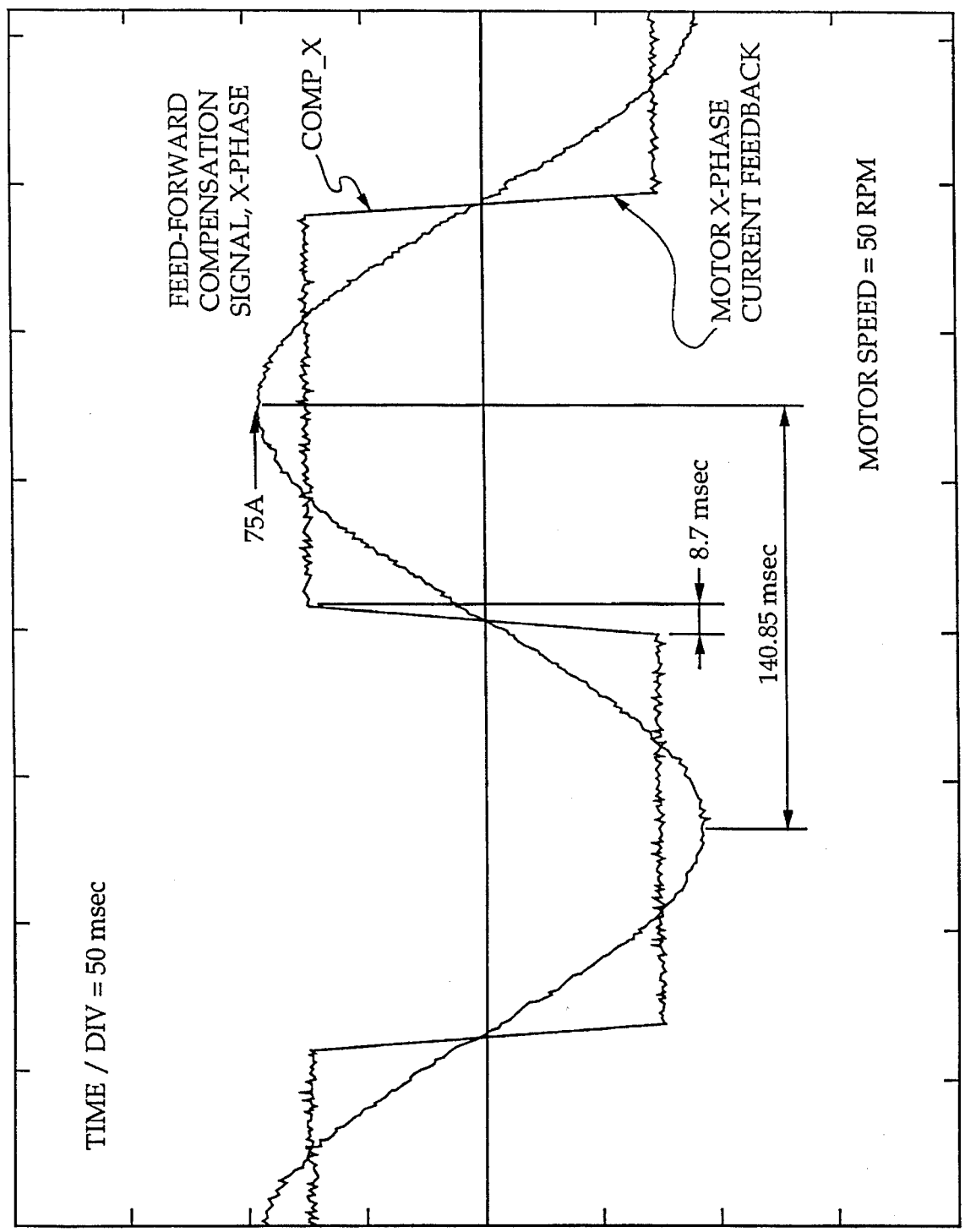
Figure 18:
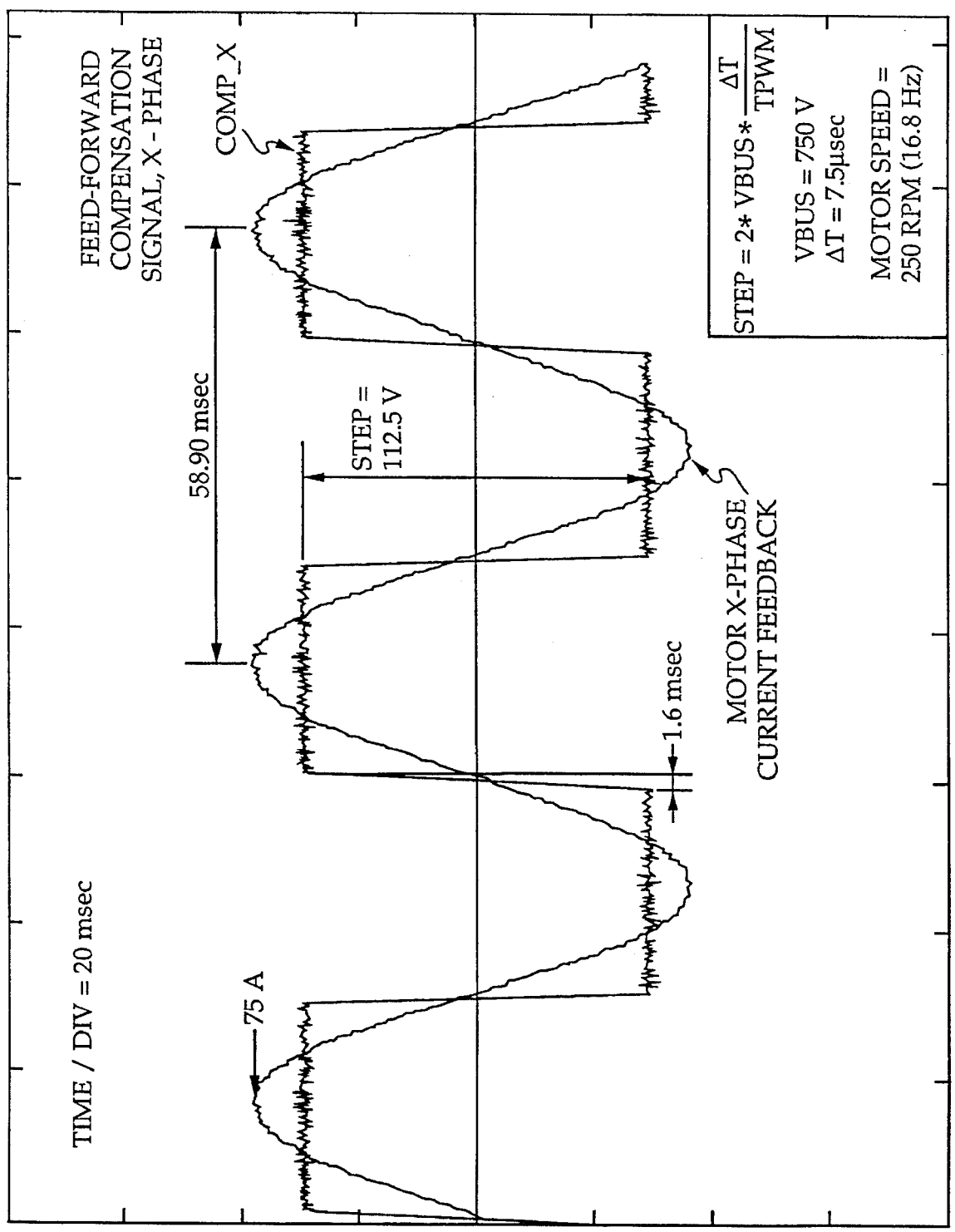

FIG. 12 shows an alternate embodiment to that of FIG. 5 for a converter with Phase-Locked Loop (PLL) synchronization with mains power supply. In this implementation, the converter is current-controlled. FIG. 10 is applicable with CNV_SIN and CNV_COS substituted for INV_SIN and INV_COS, respectively, and ADVC_SIN and ADVC_COS substituted for ADV_SIN and ADV_COS, respectively. Frequency error $\omega_{er}^e$, obtained from the PLL PI regulator, is subtracted from the converter reference frequency $\omega_{ref}^{*e}$ which is equal to the nominal mains frequency to produce the synchronous coordinates frequency $\omega_s^{*e}$. $\omega_s^{*e}$ is integrated to produce the synchronous coordinates angle $\theta_s^{*e}$. A fixed phase advancement angle $\theta_{ph}^{*e}$ is multiplied by $\omega_s^{*e}$ (note that $\omega_s^{*e}$ is constant) and added to $\theta_s^{*e}$ to produce the time-advanced synchronous coordinates angle $\theta_{AD}^{*e}$. Sines and cosines are produced in the same way as described in FIG. 11. Phase error $PH_{er}$ is produced by the phase detector. It is then filtered by a loop filter and applied to the PLL PI regulator.

Various changes, omissions, and additions may be made herein without departing from the spirit and scope of the invention.

We claim:

1. A method for compensating for a dead-time voltage disturbance, comprising:

providing a pulse width modulation (PWM) reference;

providing a feed-forward compensation signal wherein a polarity change of said feed-forward compensation signal is synchronized with a polarity change of an advanced load current reference which is advanced in time with respect to a load current reference;

adding said feed-forward compensation signal to said PWM reference.

2. The method of claim 1, wherein said load current reference is advanced in response to a sine or cosine of a time-advanced synchronous coordinates angle equal to the sum of a time advancement angle and a synchronous coordinates angle.

3. The method of claim 1, wherein said load current reference is advanced by scaling a phase advancement angle by a synchronous coordinates frequency to provide a time advancement angle and adding it to a synchronous coordinates angle to provide a time-advanced synchronous coordinates angle, the sine or cosine of which are used for transforming a synchronous coordinates load current reference, thereby producing said advanced load current reference.

4. The method of claim 1, wherein said feed-forward compensation signal is provided by transforming said synchronous coordinates load current reference by a time advancement signal for providing said advanced load current reference which is amplified and limited thereby providing said feed-forward compensation signal.

5. The method of claim 1, wherein said load current reference is an AC MAINS current and said stationary coordinates advanced load current reference is advanced in time with respect to said AC MAINS input.

6. The method of claim 1, wherein said load current reference is a stator current and said advanced load current reference is advanced in time with respect to the stator current.

7. The method of claim 1, wherein said load current reference is a magnetizing or torque current reference advanced in time in response to a time-advanced synchronous coordinates angle which is provided through the steps comprising:

providing a slip frequency;

providing a rotor position angle;

integrating said slip frequency for providing a slip angle;

multiplying said rotor position angle by the number of machine pole pairs for providing a rotor position relative to the stator;

summing said rotor position relative to the stator with said slip angle for providing a synchronous coordinates angle;

providing a rotor frequency in response to said rotor position angle;

summing said rotor frequency with said slip frequency for providing a synchronous coordinates frequency;

multiplying said synchronous coordinates frequency with a phase advancement angle for producing a time advancement angle;

summing said time advancement angle with said synchronous angle for producing said time-advanced synchronous coordinates angle.

8. A method for compensating for a dead-time voltage disturbance, comprising:

providing a pulse width modulation (PWM) reference;

providing a feed-forward compensation signal wherein a polarity change of said feed-forward compensation signal is synchronized with a polarity change of an advanced load current reference which is advanced in time with respect to said load current reference in response to a sine or cosine of a time-advanced angle equal to the sum of a synchronous coordinates angle and a time advancement angle provided in response to a phase advancement angle scaled by a synchronous coordinates frequency;

adding said feed-forward compensation signal to said PWM reference.

9. The method of claim 8, wherein said synchronous coordinates frequency is provided by the steps, comprising:

providing a slip frequency;

providing a rotor position angle;

calculating a rotor frequency in response to said rotor position angle; and summing said rotor frequency with said slip frequency for producing said synchronous coordinates frequency.

10. The method of claim 8, wherein said synchronous coordinates angle is provided by the steps, comprising:

providing a slip frequency;

integrating said slip frequency for providing a slip angle;

providing a rotor position angle;

multiplying said rotor position angle by the number of machine pole pairs for producing a rotor position relative to a stator;

summing said rotor position relative to said motor stator with said slip angle for producing said synchronous coordinates angle.

11. A method for compensating for a dead-time voltage disturbance, comprising:

providing a PWM reference;

providing a feed-forward compensation signal having an approximately trapezoidal shape; and adding said feed-forward compensation signal to said PWM reference.

12. The method of claim 11, wherein said feed-forward compensation signal has an approximately trapezoidal shape and wherein each unparallel side of the trapezoid is an approximately straight line drawn between a point prior to the polarity change of the dead-time voltage disturbance and a point following that dead-time voltage disturbance polarity change.

13. A method for compensating a dead-time voltage disturbance, comprising:

providing a PWM reference;

providing a feed-forward compensation signal wherein said feed-forward compensation signal is a function of load current frequency, and load current amplitude;

adding said feed-forward compensation signal to said PWM reference.

14. A method for compensating a dead-time voltage disturbance, comprising:

providing a synchronous coordinates magnetizing current reference;

providing a synchronous coordinates torque current reference;

providing a magnetizing current reference in stationary coordinates;

providing a torque current reference in stationary coordinates;

transforming said magnetizing current reference in synchronous coordinates and said torque current reference in synchronous coordinates into three phase advanced load current references;

providing three phase feed-forward compensation signals in response to said three phase advanced load current references for summing with PWM voltage references, thereby providing compensated PWM reference signals.

15. The method of claim 14, wherein said torque current reference in synchronous coordinates or magnetizing current reference in synchronous coordinates is transformed into said three phase advanced current references in response to a time-advanced synchronous coordinates angle.

16. The method of claim 14, wherein said magnetizing current reference in synchronous coordinates or torque current reference in synchronous coordinates is advanced by:

scaling a phase advancement angle by a synchronous frequency for providing a time advancement synchronous coordinates angle and adding it to a synchronous coordinates angle for providing a time-advanced synchronous coordinates angle, the sine or cosine of which is for transforming said synchronous coordinates load current reference thereby producing said advanced load current reference.

17. A method for compensating for a dead-time voltage disturbance, comprising:

providing a PWM reference;

calculating a feed-forward compensation signal;

synchronizing the polarity change of said feed-forward compensation signal with the polarity change of an advanced AC mains input current which is advanced in time with respect to the AC mains input current wherein said AC mains input current is advanced by:

providing a frequency error;

summing said frequency error with a reference frequency equal to the frequency of the mains input voltage to provide a synchronous frequency;

providing a time advancement angle in response to said synchronous frequency;

summing said time advancement angle with a synchronous frequency angle for providing a time-advanced angle from which said advanced AC mains input current is provided;

adding said feed-forward compensation signal to said PWM reference for providing a compensated PWM reference; and providing said compensated PWM reference to a converter.

* * * * *